(12) United States Patent
Leitner

(10) Patent No.: US 9,879,111 B2
(45) Date of Patent: *Jan. 30, 2018

(54) RESIN MIXTURE BASED ON VINYL ESTER URETHANE RESIN AND USE THEREOF

(71) Applicant: Hilti Aktiengesellschaft, Schaan (LI)

(72) Inventor: Michael Leitner, Landsberg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,857

(22) Filed: Apr. 24, 2015

(65) Prior Publication Data

US 2015/0232610 A1   Aug. 20, 2015

Related U.S. Application Data

(63) Continuation of application No. PCT/EP2013/072018, filed on Oct. 22, 2013.

(30) Foreign Application Priority Data

Oct. 24, 2012 (DE) .......... 10 2012 219 476

(51) Int. Cl.

| C08G 18/32 | (2006.01) |
|---|---|
| C08G 18/28 | (2006.01) |
| C08G 18/83 | (2006.01) |
| C08K 3/34 | (2006.01) |
| C08K 3/36 | (2006.01) |
| C08L 75/16 | (2006.01) |

(52) U.S. Cl.
CPC ....... C08G 18/3218 (2013.01); C08G 18/284 (2013.01); C08G 18/831 (2013.01); C08K 3/34 (2013.01); C08K 3/36 (2013.01); C08L 75/16 (2013.01)

(58) Field of Classification Search
CPC ..... C08L 75/16; C08G 18/831; C08G 18/284; C08G 18/3218; C08K 3/34; C08K 3/36
See application file for complete search history.

(56) References Cited

U.S. PATENT DOCUMENTS

| 4,383,051 A | 5/1983 | Meyborg et al. |
| 4,443,563 A | 4/1984 | Dirlikov et al. |
| 5,531,546 A | 7/1996 | Herdlicka et al. |
| 5,731,366 A | 3/1998 | Moench et al. |
| 2009/0012202 A1 | 1/2009 | Jacobine et al. |

FOREIGN PATENT DOCUMENTS

| CN | 101778879 A | 7/2010 | |
|---|---|---|---|
| DE | 31 11 093 A1 | 10/1982 | |
| DE | 39 40 309 A1 | 6/1991 | |
| EP | 0713015 | 5/1996 | |
| EP | 2433975 | 3/2012 | |
| JP | 2011-145330 A | * 7/2011 | |
| JP | 2011-145330 A | 7/2011 | |
| RU | 2 233 859 C2 | 8/2004 | |
| UA | 44468 C2 | 2/2002 | |
| WO | 144033 A1 | 10/2013 | |
| WO | WO 2013/144033 A1 | 10/2013 | |
| WO | WO 2013144033 A1 | * 10/2013 | ............. C07C 69/54 |

OTHER PUBLICATIONS

International Search Report, dated Dec. 2, 2013, 8 pages.
Australian Office Action, dated Sep. 1, 2016, 5 pages.
Combined Office Action and Search Report dated Feb. 17, 2017 in Chinese Patent Application No. 201380055671.1 (with English translation).
Office Action dated Mar. 27, 2013 in German Patent Application No. 10 2012 219 476.2.
Office Action in corresponding Chinese Patent Application No. 201380055671.1, dated Sep. 4, 2017, pp. 1-11, with English language translation.
"Handbook of Synthetic Resins and Plastics," Gong Yunbiao, et al., Shanghai Scientific & Technical Publishers, Aug. 1993, pp. 1302-1303, with English trans. of pp. 1302-1303.

* cited by examiner

*Primary Examiner* — Rabon Sergent

(74) *Attorney, Agent, or Firm* — Grüneberg and Myers PLLC

(57) ABSTRACT

A resin mixture comprises a vinyl ester urethane resin as the base resin, wherein the vinyl ester urethane resin can be obtained by reacting a dianhydrohexitol compound with a diisocyanate to obtain a product and reacting the obtained product with a hydroxy substituted (meth)acrylate. The resin mixture can be used to produce a reactive resin mortar containing that resin mixture and inorganic aggregates, organic aggregates or a mixture thereof. The reactive resin mortar can be used for chemical fastening.

15 Claims, No Drawings

RESIN MIXTURE BASED ON VINYL ESTER URETHANE RESIN AND USE THEREOF

RELATED APPLICATIONS

This application claims priority to, and is a continuation of International Patent Application No. PCT/EP2013/072018, having an International filing date of Oct. 22, 2013, which is incorporated herein by reference, and which claims priority to German Patent Application No. 102012219476.2, having a filing date of Oct. 24, 2012, which is also incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a resin mixture comprising a vinyl ester urethane resin based on renewable resources, in particular, a dianhydrohexitol-based vinyl ester urethane resin as a base resin, a reactive resin mortar, containing this resin mixture, as well as its use for chemical fastening.

The use of reactive resin mortars based on radically curable compounds as a binder has been known for a long time. In the field of fastening technology the use of resin mixtures as organic binders for the chemical fastening technology, for example, as a plugging compound, has proven successful. In this case it involves composite materials, which are formulated as multi-component systems, wherein in this case one component contains the resin mixture and the other component contains the curing agent. Other conventional ingredients, such as solvents, including reactive solvents (reactive diluents), may be present in one component and/or the other component. Then the hardening reaction, i.e. the polymerization, is initiated through the formation of radicals, when the two components are mixed, and the resin is hardened to form the duromer. The radically curable compounds that are often used, in particular, for chemical fastening technology include vinyl ester resins and unsaturated polyester resins.

Vinyl ester resins, in particular, vinyl ester urethane resins, which can be obtained by means of monomeric or polymeric aromatic diisocyanates and hydroxy-substituted methacrylates, such as hydroxyalkyl methacrylate, are used as the base resins due to their advantageous properties. EP 0713015 B1 describes, for example, plugging compounds with unsaturated polyester resins, vinyl ester resins, including vinyl ester urethane resins as the base resins. The compounds of such systems are based on the classical petroleum chemistry, in which the raw materials are obtained from fossil fuel sources, such as crude oil.

It is well-known that the fossil fuel sources, such as crude oil, are not inexhaustible and will eventually be depleted. In the event that the availability of fossil fuel sources decreases, there is the risk that the compounds that are essential to satisfy the high requirements imposed on the chemical fastening systems will no longer be obtainable.

Therefore, in the future there will be a need for alternative systems based on renewable resources with a high content of carbon from renewable resources, in order to continue in the future to be able to provide highly specialized chemical fastening systems.

At this point the object of the present invention is to provide a reactive resin mortar for chemical fastening technology, wherein in this case the resin component of said reactive resin mortar comprises a base resin and optionally additional constituents, such as reactive diluents, which have a very high content of carbon from renewable resources.

This engineering object is achieved by using a vinyl ester urethane resin based on a dianhydrohexitol compound as a base resin. This approach has the advantage that it is possible to use starting compounds, which may be obtained in sufficient quantity and quality from renewable resources, in order to synthesize the base resin.

BRIEF SUMMARY OF THE INVENTION

In one embodiment the present resin mixture comprises a vinyl ester urethane resin as the base resin, wherein the vinyl ester urethane resin can be obtained by reacting a dianhydrohexitol compound with a diisocyanate to obtain a product and reacting the obtained product with a hydroxy substituted (meth)acrylate.

For example, the resin mixture can be produced using at least two moles of diisocyanate per mole of the dianhydrohexitol compound. In another example, the resin mixture can be produced using at least two moles of hydroxy substituted (meth)acrylate per mole of the obtained product that is used.

In another example, the dianhydrohexitol compound can be isosorbide. In yet another example, the diisocyanate can be an aliphatic diisocyanate such as tetramethylene diisocyanate, hexamethylene diisocyanate or decamethylene diisocyanate. As yet another example, the hydroxy-substituted (meth)acrylate can be a hydroxyalkyl(meth)acrylate such as hydroxypropyl(meth)acrylate or hydroxyethyl(meth)acrylate.

For example, the starting compounds for preparing the base resin can be obtained from renewable resources such as up to 80% of the carbon being derived from renewable resources.

In another embodiment the present resin mixture can be used to produce a reactive resin mortar, containing the resin mixture and inorganic aggregates, organic aggregates or a mixture thereof. For example, the aggregates can be selected from fillers and additives. In another example, the resin mixture can be obtained in an amount of 10 to 60% by wt.

In another embodiment the reactive resin mortar can be used to produce a two component reactive resin mortar system, comprising the reactive resin mortar and a hardener. For example, the hardener can contain a radical initiator as the curing agent and optionally inorganic aggregates, organic aggregates or a mixture thereof.

The reactive resin mortar can be used for chemical fastening.

BRIEF DESCRIPTION OF SEVERAL VIEWS OF THE DRAWINGS

[Not Applicable]

DETAILED DESCRIPTION OF THE INVENTION

For a better understanding of the invention, the following explanations of the terminology used herein are considered to be useful. In accordance with the invention:

"Base resin" is defined as the pure, curing or curable compound that hardens by polymerization by itself or with reagents, such as hardeners, accelerators, and the like (not included in the base resin); and the curable compounds may be monomers, dimers, oligomers, and prepolymers.

"Resin masterbatch" is defined as the product of the preparation of the base resin after synthesis (without isolation of the base resin), where in this case the base resin may contain reactive diluents, stabilizers and catalysts (including synthesis solution).

"Resin mixture" is defined as a mixture of the resin masterbatch and accelerators as well as stabilizers and optionally other reactive diluents; this term is used interchangeably with the term "organic binder".

"Reactive resin mortar" is defined as a mixture composed of the resin mixture and the inorganic aggregates; the term "A component" is used interchangeably with the term "reactive resin mortar".

"Curing agents" are defined as substances that effect the polymerization (curing) of the base resin.

"Hardener" is defined as a mixture composed of curing agents and organic and/or inorganic aggregates; this term is used interchangeably with the term "B component."

"Accelerator" is defined as a compound that is capable of accelerating the polymerization reaction (curing) and that is used to accelerate the formation of the radical initiator.

"Polymerization inhibitor" is defined as a compound that is capable of inhibiting the polymerization reaction (curing) and that is used, on the one hand, to prevent the polymerization reaction and, in so doing, an undesirable premature polymerization of the radically polymerizable compound during storage, where in this case these compounds are usually used in such small amounts that the gel time is not affected. On the other hand, said polymerization inhibitor is used to delay the polymerization reaction immediately after the addition of the curing agent, where in this case these compounds are usually used in such amounts that the gel time is affected.

"Reactive diluents" are defined as liquid or low viscosity base resins that dilute other base resins, the resin master batch or the resin mixture, and, as a result, provide the necessary viscosity for their application, contain functional groups, which are capable of reacting with the base resin and during the polymerization (curing) become for the most part a constituent of the cured composition (mortar).

"Gel time" for unsaturated polyester resins or vinyl resins, which are usually cured with peroxides: the time of the curing phase of the resin corresponds to the gel time, in which the temperature of the resin increases from +25 deg. C. to +35 deg. C. This time corresponds roughly to the period, in which the fluidity or viscosity of the resin is still in such a range that the reaction resin or more specifically the reactive resin composition can be easily processed or finished.

"Gel time drift" (for any particular selected period, for example 30 or 60 days) refers to the phenomenon that when the curing at a different time than at the reference standard time of curing, for example, 24 hours after the preparation of the reactive resin or more specifically the reactive resin composition, the gel time that is observed deviates from that at the time of the reference.

"Mortar composition" refers to a formulation that, in addition to the reactive resin composition, contains additional organic and/or inorganic fillers and that can be used as such directly for chemical fastening.

"Two component mortar system" is a system that comprises an A component, the reactive resin mortar, and a B component, the hardener, where in this case the two components are stored separately to inhibit the reaction, so that the reactive resin mortar does not cure until after it has been mixed.

"(Meth)acryl . . . / . . . (meth)acryl . . . " means that both the "methacryl . . . / . . . methacryl . . . " compounds as well as the "acryl . . . / . . . acryl" compounds are supposed to be included.

"Vinyl ester urethanes" are defined as vinyl esters having secondary hydroxyl groups that have been reacted with polyisocyanates in a polyaddition process, as a result of which urethane bridges are obtained.

"Renewable resources" are defined as the raw materials, in particular, organic matter of vegetable or animal origin that are used totally or partially as the raw materials for industry and that are biologically renewable, unlike fossil fuel resources, i.e. they renew themselves within reasonable periods of time; contain non-mineral resources or non-fossil fuel resources that can be used in an industrial or commercial processing operation.

"Cold curing" means that the resin mixtures and the reactive resin mortar are able to cure completely at room temperature.

Reactive resin mortars are generally prepared by adding the starting compounds, which are required for the preparation of the base resin, if desired, together with catalysts and solvents, in particular, reactive diluents, in a reactor and by reacting with one another. Upon completion of the reaction and, if desired, as early as at the start of the reaction, polymerization inhibitors for storage stability are added to the reaction mixture, as a result of which the so-called resin masterbatch is obtained. Added to the resin masterbatch are often accelerators for curing the base resin, optionally additional polymerization inhibitors, which may be the same as or different from the polymerization inhibitor for storage stability, for adjusting the gel time, and optionally an additional solvent, in particular, reactive diluents, so that the net result is the resin mixture. In order to adjust various properties, such as the rheology and the concentration of the base resin, this resin mixture is treated with inorganic and/or organic aggregates, as a result of which the reactive resin mortar is obtained.

Based on the aforesaid, a preferred resin mixture contains at least one base resin, at least one reactive diluent, at least one accelerator, at least one polymerization inhibitor. A reactive resin mortar contains, in addition to the resin mixture described above, inorganic and/or organic aggregates, where in this case inorganic aggregates are given even more preference, which will be described in greater detail below.

The invention was based on the idea of providing a resin mixture that contains a base resin, which can be prepared from starting compounds from biomass and, as a result, from renewable resources. Correspondingly, the starting compounds were selected according to their potential of being obtainable from renewable resources.

A first subject matter of the invention relates to a resin mixture comprising a vinyl ester urethane resin as the base resin, where in this case the vinyl ester urethane resin can be obtained by (i) reacting a dianhydrohexitol compound with a diisocyanate and then (ii) reacting the obtained product with a hydroxy-substituted (meth)acrylate.

Surprisingly it has been possible to provide on the basis of a dianhydrohexitol-based vinyl ester urethane resin as the base resin a reactive resin mortar, which has an acceptable bond strength and is, therefore, suitable, for example, as an organic binder for chemical fastening technology.

The diisocyanates that are typically used as the starting compounds for the synthesis of vinyl ester urethane resin are obtained, according to the invention, by reacting a dihydroxy compound with a diisocyanate, so that the products necessarily have isocyanate groups at the end of the molecule and two urethane groups in the main chain of the molecule. It is expedient to use at least two moles of diisocyanate per mole of the dihydroxy compound, so that in each case one isocyanate group of the diisocyanate reacts with a hydroxy group of the dihydroxy compound to form a urethane group. Preferably, however, the diisocyanate is added in a slight excess, in order to prevent as far as possible an oligomerization. Each of the isocyanate end groups is reacted with a hydroxy-substituted (meth)acrylate.

In order to be able to obtain the starting compounds from renewable resources, the dihydroxy compound is, according to the invention, a dianhydrohexitol compound. Dianhydrohexitol compounds, or more specifically 1,4:3,6-dianhydrohexitol compounds, are by-products of the starch industry. They can be obtained, for example, by dehydration of D-hexitols, which in turn can be obtained by a simple reduction of hexose sugars. As a result, the dianhydrohexitol compounds are chiral products that can be obtained from biomass. Depending on the configuration of the two hydroxyl groups, a distinction is made between three different isomers: isosorbide (structure A), isomannitol (structure B) and isoidide (structure C), all three isomers being obtainable by hydrogenation and subsequent double dehydration of D-glucose, D-mannose or L-fructose.

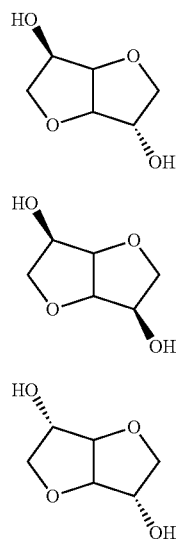

A

B

C

Thus, in the case of the dianhydrohexitol compound that is used as a starting material, it may be an isosorbide, isomannitol or isoidide or a mixture of these dianhydrohexitol compounds. Therefore, in the following the term dianhydrohexitol compounds may be construed to mean the respective discrete compound as well as any mixture of the various individual compounds. Since isosorbide is the most common, it is used preferably as the starting compound for the reaction with the diisocyanate.

The dianhydrohexitol compounds and method for their preparation are well-known; and corresponding products are available on the market.

Hence, in order to be able to obtain also diisocyanate from renewable resources, it is expedient for the diisocyanate to be an aliphatic diisocyanate, such as tetramethylene diisocyanate, hexamethylene diisocyanate or decamethylene diisocyanate.

The use of tetramethylene diisocyanate has the advantage that it is obtainable from a basic building block C4 of vegetable origin, namely succinic acid (Chemical Engineering & Technology Special Issue: Change of raw materials, Volume 31, Issue 5, pages 647 (2008) in the article "Succinic Acid: A New Platform Chemical for Bio-based Polymers from Renewable Resources" by I. Bechthold, K. Bretz, S. Kabasci, R. Kopitzky and A. Springer). The authors start on the premise that succinic acid will be one of the future basic chemicals that can be obtained from renewable resources.

Furthermore, in the meantime hexamethylene diisocyanate (HDMI) has been made accessible from renewable resources, because, according to U.S. Pat. No. 8,421,879, the corresponding precursor adipic acid is accessible from biomass.

The use of decamethylene diisocyanate also has the advantage that it is obtainable from a basic building block C10 of vegetable origin, namely, sebacic acid. The basic building block C10, which can be obtained from bio-based castor oil, is described in detail in the literature (European Journal of Lipid Science and Technology, Special Issue: Oil and fats as renewable resources for the chemical industry, Volume 112, Issue 1, Pages 10 (2010), in the article "Castor oil as a renewable resource for the chemical industry" by Hatice Mutlu and Michael A. R. Meier). In this article the authors also start on the premise that castor oil is a very valuable source of renewable raw materials for the chemical industry.

In addition, however, other diisocyanates, which are obtainable from renewable resources, can be used according to the invention, such as diisocyanates of fatty acids or from other sources, as described in WO 2011/098272 A2.

The hydroxy-substituted (meth)acrylates can also be obtained from renewable resources. In particular, these hydroxy-substituted (meth)acrylates involve aliphatic hydroxyalkyl(meth)acrylates, such as hydroxypropyl(meth)acrylate or hydroxyethyl(meth)acrylate, of which the methacrylate compounds are even more highly preferred.

Propylene glycol, which is required for the synthesis of hydroxypropyl methacrylate, can be obtained from glycerol (CEPmagazine.org, www.aiche.org/cep (August 2007) in the article "A Renewable Route to Propylene Glycol" by Suzanne Shelley). Glycerol is an essential by-product in the production of biodiesel. Thus, it is an inexpensive, sustainable and environmentally friendly alternative to the conventional raw material, which is derived from petroleum, for the preparation of propylene glycol.

Ethylene glycol, which is required for the synthesis of hydroxyethyl methacrylate, can also be obtained from raw materials, such as ethylene oxide and derivatives thereof, such as glycols, which can be obtained from biomass, such as molasses or sugar cane.

The $C_2$- and $C_3$-hydroxyalkyl methacrylates are available on the market.

In addition, however, other hydroxy-substituted (meth)acrylates, which can be obtained from renewable resources, are used according to the invention.

An especially preferred base resin has the following formula:

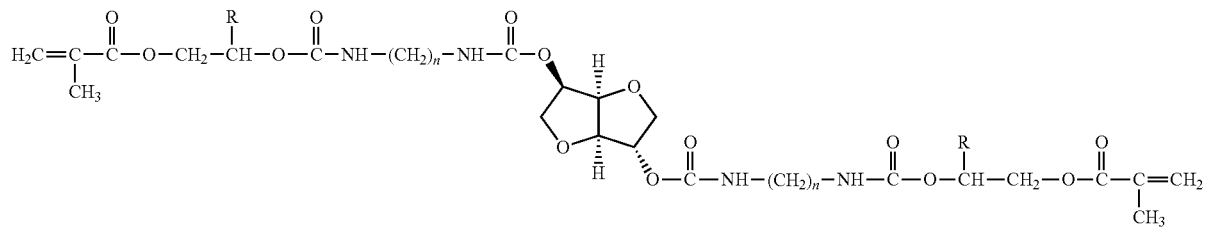

where n is 4, 6 or 10; and R denotes hydrogen or a methyl group.

If all of the starting compounds are obtained from renewable resources, such as biomass, and if a 65% by wt. solution is prepared from the vinyl ester urethane resin in hydroxypropyl methacrylate or hydroxyethyl methacrylate for the purpose of preparing a resin mixture, then up to 80% of the carbon content of the resin mixture may be derived from renewable resources.

In a preferred embodiment of the invention the resin mixture contains additional low viscosity, radically polymerizable compounds, preferably those that can be obtained from renewable resources, as the reactive diluents, in order to adjust, if necessary, for example, the viscosity of the vinyl ester urethane resins or the precursors in the preparation thereof. The reactive diluents may be added in an amount of 90 to 10% by wt., preferably 70 to 30% by wt., based on the resin mixture. In this context reference is made to WO 09/156648 A1, WO 10/061097 A1, WO 10/079293 A1 and WO 10/099201 A1, the disclosure of which is hereby incorporated in its entirety by reference in this patent application.

As an alternative, the resin mixture may contain any suitable reactive diluent. It is expedient that the resin mixture contain as the reactive diluent an aliphatic or aromatic $C_5$-$C_{15}$-(meth)acrylic acid ester, where in this case (meth) acrylic acid esters are, in particular, preferably selected from the group consisting of hydroxypropyl(meth)acrylate, 1,2-ethanediol di(meth)acrylate, 1,3-propanediol di(meth)acrylate, 1,2-butanediol di(meth)acrylate, 1,4-butanediol di(meth)acrylate, trimethylolpropane tri(meth)acrylate, phenylethyl(meth)acrylate, tetrahydrofurfuryl(meth)acrylate, ethyl triglycol(meth)acrylate, N,N-dimethylaminoethyl (meth)acrylate, N,N-dimethylaminomethyl (meth)acrylate, acetoacetoxyethyl(meth)acrylate, isobornyl(meth)acrylate, 2-ethyl hexyl(meth)acrylate, diethylene glycol di(meth) acrylate, methoxypolyethylene glycol mono(meth)acrylate, trimethylcyclohexyl(meth)acrylate, 2-hydroxyethyl(meth) acrylate, dicyclopentenyloxyethyl (meth)acrylate and/or tricyclopentadienyl di(meth)acrylate, bisphenol A (meth)acrylate, novolak epoxy di(meth)acrylate, di-[(meth)acryloyl-maleoyl]-tricyclo-5.2.1.0.$^{26}$-decane, dicyclopentenyloxyethyl crotonate, 3-(meth)acryloyl-oxymethyl-tricylo-5.2.1.0.$^{26}$-decane, 3-(meth)cyclopentadienyl (meth)acrylate, isobornyl(meth)acrylate and decalyl-2-(meth)acrylate; PEG-di(meth)acrylate, such as PEG200-di (meth)acrylate, tetraethylene glycol di(meth)acrylate, solketal(meth)acrylate, cyclohexyl(meth)acrylate, phenoxyethyl di(meth)acrylate, methoxyethyl(meth)acrylate, tetrahydrofurfuryl(meth)acrylate, tert-butyl(meth)acrylate and norbornyl(meth)acrylate. In principle, other conventional radically polymerizable compounds may also be used, alone or in admixture with the (meth)acrylic acid esters, for example, styrene, alpha-methylstyrene, alkylated styrenes, such as tert-butyl styrene, divinylbenzene, and allyl compounds, where in this case the representatives thereof are preferred that can be obtained from basic chemicals, based on renewable resources.

In order to stabilize against premature polymerization (storage stability) and to adjust the gel time and the reactivity, the resin mixture may contain a polymerization inhibitor. In order to ensure stability in storage, the polymerization inhibitor is contained preferably in an amount of 0.0005 to 2% by wt., even more highly preferred 0.01 to 1% by wt., based on the resin mixture. In order to adjust the gel time and the reactivity, the resin mixture may additionally contain 0.005 to 3% by wt., preferably 0.05 to 1% by wt. of a polymerization inhibitor.

Suitable polymerization inhibitors are, according to the invention, the polymerization inhibitors that are commonly used for radically polymerizable compounds and which are well-known to the person skilled in this art.

In order to stabilize against premature polymerization, resin mixtures and reactive resin mortar typically comprise polymerization inhibitors, such as hydroquinone, substituted hydroquinones, for example, 4-methoxyphenol, phenothiazine, benzoquinone or tert-butyl pyrocatechol, as described, for example, in EP 1935860 A1 or EP 0965619 A1, stable nitroxyl radicals, also called N-oxyl radicals, such as piperidinyl-N-oxyl or tetrahydropyrrole-N-oxyl, as described, for example, in DE 19531649 A1. In particular, 4-hydroxy-2,2,6,6-tetramethylpiperidine-N-oxyl (hereinafter referred to as Tempol) is used preferably for stabilization, a measure that has the advantage that it also allows the gel time to be adjusted.

Preferably the polymerization inhibitors are selected from phenolic compounds and non-phenolic compounds, such as stable radicals and/or phenothiazines.

Suitable phenolic polymerization inhibitors, which are often a constituent of commercial, radically curing reactive resins, may include phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol and butyl pyrocatechols, such as 4-tert-butyl pyrocatechol, 4,6-di-tert-butylpyrocatechol, hydroquinones, such as hydroquinone, 2-methyl hydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methyl benzoquinone, 2,6-dimethylbenzoquinone, naphthoquinone, or mixtures of two or more thereof.

Preferably phenothiazines, such as phenothiazine and/or derivatives or combinations thereof, or stable organic free radicals, such as galvinoxyl radicals and N-oxyl radicals, may be considered to be non-phenolic polymerization inhibitors.

Suitable stable N-oxyl radicals (nitroxyl radicals) may be selected from 1-oxyl-2,2,6,6-tetramethylpiperidine, 1-oxyl-2,2,6,6-tetramethylpiperidine-4-ol (also referred to as TEMPOL), 1-oxyl-2,2,6,6-tetramethylpiperidine-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL), aluminum-N-nitrosophenyl hydroxylamine, diethyl hydroxylamine, all of which are described in DE 199 56 509. Furthermore, suitable N-oxyl compounds are oximes, such as acetaldoxime, acetone oxime, methyl ethyl ketoxime, salicyloxime, benzoxime, glyoxime, dimethylglyoxime, acetone-O-(benzyloxycarbonyl)oxime and the like. Furthermore, in the para position to the hydroxyl group the substituted pyrimidinol compounds or pyridinol compounds, which are described in the patent application DE 10 2011 077 248 B1, which is not a prior publication, can be used as the stabilizers.

Depending on the desired properties and the use of the resin mixture, the polymerization inhibitors can be used, either alone or as a combination of two or more thereof. In this case the combination of phenolic and non-phenolic inhibitors enables a synergistic effect, which is also demonstrated by the adjustment of a more or less drift-free setting of the gelling time of the reactive resin formulation.

Preferably the curing of the resin constituent is initiated with a radical initiator, such as a peroxide. In addition to the radical initiator, an accelerator may also be used. As a result, fast curing reactive resin mortars are obtained, said mortars being cold curing, i.e. cure at room temperature. Suitable accelerators, which are usually added to the resin mixture, are well-known to the person skilled in this art. Said accelerators are, for example, amines, preferably tertiary amines and/or metal salts.

Suitable amines are selected from the following compounds, which are described, for example, in the patent application US 2011071234 A1: dimethylamine, trimethylamine, ethylamine, diethylamine, triethylamine, n-propylamine, di-n-propylamine, tri-n-propylamine, isopropylamine, diisopropylamine, triisopropylamine, n-butylamine, isobutylamine, tert-butylamine, di-n-butylamine, diisobutylamine, tri-isobutylamine, pentylamine, isopentylamine, diisopentylamine, hexylamine, octylamine, dodecylamine, laurylamine, stearylamine, aminoethanol, diethanolamine, triethanolamine, aminohexanol, ethoxyaminoethane, dimethyl-(2-chloroethyl)amine, 2-ethyl hexylamine, bis-(2-chloroethyl)amine, 2-ethyl hexylamine, bis-(2-ethylhexyl)amine, N-methylstearylamine, dialkylamines, ethylene diamine, N,N'-dimethyl ethylene diamine, tetramethyl ethylene diamine, diethylene triamine, permethyl diethylene triamine, triethylene tetramine, tetraethylene pentamine, 1,2-diaminopropane, di-propylene triamine, tripropylene tetramine, 1,4-diaminobutane, 1,6-diaminohexane, 4-amino-1-diethylaminopentane, 2,5-diamino-2,5-dimethylhexane, trimethyl hexamethylene diamine, N,N-dimethylaminoethanol, 2-(2-diethylaminoethoxyl)ethanol, bis-(2-hydroxyethyl)oleylamine, tris-[2-(2-hydroxyethoxy)-ethyl]amine, 3-amino-1-propanol, methyl-(3-aminopropyl)ether, ethyl-(3-aminopropyl)ether, 1,4-butanediol-bis(3-aminopropylether), 3-dimethylamino-1-propanol, 1-amino-2-propanol, 1-diethylamino-2-propanol, diisopropanolamine, methylene-bis-(2-hydroxypropyl)amine, tris-(2-hydroxypropyl)amine, 4-amino-2-butanol, 2-amino-2-methylpropanol, 2-amino-2-methyl-propanediol, 2-amino-2-hydroxymethylpropandiol, 5-diethylamino-2-pentanone, 3-methylaminopropionic acid nitrile, 6-aminohexanoic acid, 11-aminoundecanoic acid, 6-aminohexanoic acid ethyl ester, 11-aminohexanoic acid isopropyl ester, cyclohexylamine, N-methylcyclohexylamine, N,N-dimethylcyclohexylamine, dicyclohexylamine, N-ethylcyclohexylamine, N-(2-hydroxyethyl)-cyclohexylamine, N,N-bis-(2-hydroxyethyl)-cyclohexylamine, N-(3-aminopropyl)-cyclohexylamine, aminomethylcyclohexane, hexahydrotoluidine, hexahydrobenzylamine, aniline, N-methylaniline, N,N-dimethylaniline, N,N-diethylaniline, N,N-di-propylaniline, iso-butylaniline, toluidine, diphenylamine, hydroxyethylaniline, bis-(hydroxyethyl)aniline, chloroaniline, aminophenols, aminobenzoic acids and the esters thereof, benzylamine, dibenzylamine, tribenzylamine, methyldibenzylamine, a-phenylethylamine, xylidine, diisopropylaniline, dodecylaniline, aminonaphthalene, N-methylaminonaphthaline, N,N-dimethylaminonaphthalene, N,N-dibenzylnaphthaline, diaminocyclohexane, 4,4'-diamino-dicyclohexylmethane, diaminodimethyl-dicyclohexylmethane, phenylenediamine, xylylenediamine, diaminobiphenyl, naphthalenediamines, toluidines, benzidines, 2,2-bis-(aminophenyl)propane, aminoanisoles, amino-thiophenols, aminodiphenyl ether, aminocresols, morpholine, N-methylmorpholine, N-phenyl-morpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholinethane, [2,2,2]-diazabicyclooctane and N,N-dimethyl-p-toluidine.

Preferred amines are aniline derivatives and N,N-bisalkylarylamine, such as N,N-dimethylaniline, N,N-diethylaniline, N,N-dimethyl-p-toluidine, N,N-bis(hydroxyalkyl)arylamine, N,N-bis(2-hydroxyethyl)aniline, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine and 4,4'-bis(dimethylamino)diphenylmethane.

Polymeric amines, such as those that are obtained by polycondensation of N,N-bis(hydroxyalkyl)aniline with dicarboxylic acids or by polyaddition of ethylene oxide to these amines, also lend themselves well as accelerators.

Suitable metal salts are, for example, cobalt octoate or cobalt naphthenoate as well as vanadium carboxylate, potassium carboxylate, calcium carboxylate, copper carboxylate, manganese carboxylate or zirconium carboxylate.

If an accelerator is used, it is used in an amount of 0.01 to 10% by wt., preferably 0.2 to 5% by wt., based on the resin mixture.

An additional subject matter of the invention is a reactive resin mortar, which contains (in addition to the above described resin mixture, the organic binder) inorganic and/or organic aggregates, such as fillers, and/or additional additives.

The content of the resin mixture in the reactive resin mortar is preferably 10 to 60% by wt., even more highly preferred 20 to 30% by wt., based on the reactive resin mortar. As a result, the aggregate content is preferably 90 to 40% by wt., even more highly preferred 80 to 70% by wt., based on the reactive resin mortar.

Fillers that may be used include the conventional fillers, preferably mineral fillers or mineral-like fillers, such as quartz, glass, sand, silica sand, quartz powder, porcelain, corundum, ceramics, talc, silicic acid (for example, pyrogenic silicic acid), silicates, clay, titanium dioxide, chalk, heavy spar, feldspar, basalt, aluminum hydroxide, granite or sandstone, polymeric fillers, such as thermosetting plastic resin, hydraulically curable fillers, such as gypsum, anhydrous lime or cement (for example, aluminous cement or Portland cement), metals, such as aluminum, carbon black, furthermore, wood, mineral fibers or organic fibers, or the like, or mixtures of two or more thereof, which may be added as a powder, in granular form or in the form of shaped bodies. The fillers may be present in any form, such as a powder or flour, or as shaped bodies, for example, in the form of a cylinder, ring, ball, plate, rod, saddle or crystal or, furthermore, in fiber form (fibrillar fillers); and the corresponding base particles preferably have a maximum diameter of 10 mm. Fillers are present in the respective component, preferably in an amount of up to 90, in particular, 3 to 85, above all, 5 to 70% by wt. However, the globular, inert substances (spherical shape) are preferred due to their significantly higher reinforcing effect.

Furthermore, other conceivable additives are thixotropic agents, such as optionally organically aftertreated pyrogenic silicic acid, bentonites, alkyl cellulose and methyl cellulose, castor oil derivatives or the like; plasticizers, such as phthalic acid esters or sebacic acid esters, stabilizers, antistatic agents, thickening agents, flexibilizers, curing catalysts, rheological mediums, wetting agents, coloring additives, such as colorants or, in particular, pigments, for example for variable staining of the components for better monitoring of the mixing, or the like, or mixtures of two or more thereof, are possible. Non-reactive diluents (solvents) may also be present, preferably in an amount of up to 30% by wt., based on the respective component (reactive resin mortar, hardener), for example, from 1 to 20% by wt., such as lower alkyl ketones, for example, acetone, di-lower alkyl lower alkanoyl amides, such as dimethylacetamide, lower alkyl benzenes, such as xylenes or toluene, phthalic acid esters or paraffins, or water.

In a preferred embodiment of the invention the reactive resin mortar of the invention is formulated as a two component system or a multi-component system, in particular, a two component system, where in this case the resin constituent and the hardener constituent are accommodated separately to inhibit the reaction. Correspondingly a first component contains the A component, the reactive resin mortar; and a second component contains the B component, the hardener. This measure ensures that the curable compounds and the curing agent are not mixed together until immediately before use and initiate the curing reaction.

The hardener contains the curing agent for initiating the polymerization (curing) of the resin constituent. This curing agent is, as stated above, a radical initiator, preferably a peroxide.

Any and all peroxides, which are used for curing vinyl ester resins and with which the person skilled in this art is familiar, can be used, according to the invention, for curing the dianhydrohexitol-based vinyl ester urethane resins. Such peroxides include organic and inorganic peroxides, either liquid or solid, where in this case hydrogen peroxide can also be used. Some examples of suitable peroxides are peroxycarbonates (of the formula —OC(O)OO—), peroxy esters (of the formula —C(O)OO—), diacyl peroxides (of the formula —C(O)OOC(O)—), dialkyl peroxides (of the formula —OO—) and the like. These peroxides may be present as an oligomer or polymer. A comprehensive list of examples of suitable peroxides is described, for example, in the patent application US 2002/0091214 A1, paragraph [0018].

The peroxides are selected preferably from the group of organic peroxides. Suitable organic peroxides are: tertiary alkyl hydroperoxides, such as tert-butyl hydroperoxide, and other hydroperoxides, such as cumene hydroperoxide, peroxy esters or peracids, such as tert-butyl perester, benzoyl peroxide, peracetates and perbenzoates, lauryl peroxide, including (di)peroxy ester, perethers, such as peroxy diethyl ether, perketones, such as methyl ethyl ketone peroxide. The organic peroxides that are used as hardeners are often tertiary peresters or tertiary hydroperoxides, i.e. peroxide compounds with tertiary carbon atoms that are bonded directly to an —O—O-acyl group or an —OOH group. However, it is also possible to use, according to the invention, mixtures of these peroxides with other peroxides. The peroxides may also be mixed peroxides, i.e., peroxides that have two different peroxide-bearing units in one molecule. Benzoyl peroxide (BPO) is used preferably for curing.

Furthermore, the hardener of the two component mortar system comprises preferably inorganic aggregates, where in this case the aggregates are the same as the aggregates that may be added to the reactive resin mortar.

In a particularly preferred embodiment of the two component mortar system, the A component also contains, in addition to the reactive resin mortar, additionally a hydraulically setting or polycondensable inorganic compound; and the B component contains, in addition to the curing agent, also water. Such mortar compositions are described in detail in DE 42 31 161 A1. In this case the A component contains preferably a hydraulically setting or polycondensable inorganic compound cement, for example, as Portland cement or aluminate cement, where in this case cements that contain no iron oxide or have a reduced iron oxide content are even more highly preferred. Gypsum can also be used as such or in admixture with the cement as the hydraulically setting inorganic compound. Silicious, polycondensable compounds, in particular, soluble, dissolved and/or amorphous silicon dioxide-containing substances may also be used as the polycondensable inorganic compound.

The two component mortar system comprises preferably the A component and the B component, stored separately to inhibit the reaction, in different containers, for example a multi-chamber device, such as a multi-chamber capsule and/or cartridge. When mechanical compression forces are applied or subject to the action of a gas pressure, the two components are pressed out of the containers and mixed. An additional option consists of fabricating the two component mortar system as two component capsules that are inserted into the borehole and are destroyed by the impact-rotating setting of the fixing element with simultaneous mixing of the two components of the mortar composition. Preference is given to a capsule system or an injection system, in which the two components are squeezed out of the separate containers and passed through a static mixer, in which they are mixed homogeneously and then discharged through a nozzle preferably directly into the borehole.

The inventive resin mixture, the reactive resin mortar and the two component mortar system are used primarily in the construction field, for example, to repair concrete, as polymer concrete, as a coating composition based on synthetic resins or as a cold-curing road marking. In particular, they lend themselves well to chemical fastening of anchoring elements, such as anchors, rebar, screws and the like, in boreholes, in particular, in boreholes in a variety of different substrates, in particular, mineral substrates, such as those based on concrete, aerated concrete, brickwork, calcareous sandstone, sandstone, natural stone and the like.

The following examples serve to explain the invention in more detail.

EXAMPLES

A) Resin Masterbatch Syntheses
A1) Use of Tetramethylene Diisocyanate (TMDI)

Example A1.1

A 500 ml three-necked flask is filled with 260 g of 1,3-propanediol dimethacrylate (Sarbio6200; Sartomer) and 50 g of TMDI and treated with 30 mg of dioctyl tin dilaurate (Tegokat216; Goldschmidt Industrial Chemical Corporation), 20 mg of butylated hydroxytoluene (BHT) and 40 mg of 4-hydroxy-2,2,6,6-tetramethylpiperidine-N-oxyl (Tempol). The solution is thermally regulated at 60 deg. C. Then 20 g of isosorbide are added in 20 equal portions to the stirred solution over a period of 60 minutes. Upon completion of the addition of the isosorbide, the mixture is heated to 70 deg. C. and stirred for 5 hours at this temperature. The reaction of the isosorbide is monitored by means of thin layer chromatography. After 5 hours the conversion of the isosorbide was complete. Then 50 g of hydroxypropyl methacrylate (HPMA) (VISIOMER® HPMA 98; Evonik Industries) are added drop-by-drop over a period of 60 minutes, and the resulting mixture is stirred at 80 deg. C., until the NCO content is less than 0.2%, measured according to DIN EN 1242.

Example A1.2

A 500 ml three-necked flask is filled with 250 g of 1,4-butanediol dimethacrylate and 40 g of TMDI and treated with 60 mg of dioctyl tin dilaurate (Tegokat216), 40 mg of BHT and 90 mg of Tempol. The solution is thermally regulated at 60 deg. C. Then 20 g of isosorbide are added in 20 equal portions to the stirred solution over a period of 60 minutes. Upon completion of the addition of the isosorbide, the mixture is heated to 70 deg. C. and stirred for 5 hours at this temperature. The reaction of the isosorbide is monitored by means of thin layer chromatography. After 5 hours the conversion of the isosorbide was complete. Then 40 g of HPMA are added drop-by-drop over a period of 60 minutes, and the resulting mixture is stirred at 80 deg. C., until the NCO content is less than 0.2%, measured according to DIN EN 1242.

A2) Use of Hexamethylene Diisocyanate (HMDI)

Example A2.1

A 500 ml three-necked flask is filled with 130 g of 1,3-propanediol dimethacrylate (Sarbio6200), 130 g of 1,4-butanediol dimethacrylate and 50 g of HMDI and treated with 30 mg of dioctyl tin dilaurate (Tegokat216), 20 mg of BHT and 40 mg of Tempol. The solution is thermally regulated at 60 deg. C. Then 20 g of isosorbide are added in 20 equal portions to the stirred solution over a period of 60 minutes. Upon completion of the addition of the isosorbide, the mixture is heated to 70 deg. C. and stirred for 5 hours at this temperature. The reaction of the isosorbide is monitored by means of thin layer chromatography. After 5 hours the conversion of the isosorbide was complete. Then 50 g of HPMA are added drop-by-drop over a period of 60 minutes, and the resulting mixture is stirred at 80 deg. C., until the NCO content is less than 0.2%, measured according to DIN EN 1242.

Example A2.2

A 500 ml three-necked flask is filled with 250 g of (2,2-dimethyl-1,3-dioxolane-4-yl)methyl methacrylate (solketal methacrylate) and 45 g of HMDI and treated with 30 mg of dioctyl tin dilaurate (Tegokat216), 30 mg of BHT and 40 mg of Tempol. The solution is thermally regulated at 60 deg. C. Then 20 g of isosorbide are added in 20 equal portions to the stirred solution over a period of 60 minutes. Upon completion of the addition of the isosorbide, the mixture is heated to 70 deg. C. and stirred for 5 hours at this temperature. The reaction of the isosorbide is monitored by means of thin layer chromatography. After 5 hours the conversion of the isosorbide was complete. Then 45 g of HPMA are added drop-by-drop over a period of 60 minutes, and the resulting mixture is stirred at 80 deg. C., until the NCO content is less than 0.2%, measured according to DIN EN 1242.

A3) Use of Decamethylene Diisocyanate (DMDI)

Example A3.1

A 500 ml three-necked flask is filled with 230 g of 1,3-propanediol dimethacrylate (Sarbio6200) and 60 g of DMDI and treated with 60 mg of dioctyl tin dilaurate (Tegokat216), 40 mg of BHT and 90 mg of Tempol. The solution is thermally regulated at 60 deg. C. Then 20 g of isosorbide are added in 20 equal portions to the stirred solution over a period of 60 minutes. Upon completion of the addition of the isosorbide, the mixture is heated to 70 deg. C. and stirred for 5 hours at this temperature. The reaction of the isosorbide is monitored by means of thin layer chromatography. After 5 hours the conversion of the isosorbide was complete. In order to lower the viscosity of the mixture, the mixture is diluted with 35 g of tetrahydrofurfuryl methacrylate (Sarbio6100). Then 40 g of HPMA are added drop-by-drop over a period of 60 minutes, and the resulting mixture is stirred at 80 deg. C., until the NCO content is less than 0.2%, measured according to DIN EN 1242.

B) Resin Mixtures
B1) Use of Tetramethylene Diisocyanate (TMDI)

Example B1.1

380 g of the resin masterbatch, prepared according to Example A1.1, are treated at 50 deg. C. with 100 g of 1,4-butanediol dimethacrylate (BDDMA) as well as with 2 g of tert-butyl pyrocatechol (tBBK); and then the gel time is set to 6 minutes at room temperature with the addition of an aromatic amine.

Example B1.2

350 g of the resin masterbatch, prepared according to Example A1.2, are treated at 50 deg. C. with 90 g of BDDMA as well as with 2 g of tBBK; and then the gel time is set to 6 minutes at room temperature with the addition of an aromatic amine.

B2) Use of Hexamethylene Diisocyanate

Example B2.1

380 g of the resin masterbatch, prepared according to Example A2.1, are treated at 50 deg. C. with 100 g of BDDMA as well as with 2 g of tBBK; and then the gel time is set to 6 minutes at room temperature with the addition of an aromatic amine.

Example B2.2

360 g of the resin masterbatch, prepared according to Example A2.2, are treated at 50 deg. C. with 90 g of BDDMA as well as with 2 g of tBBK; and then the gel time is set to 6 minutes at room temperature with the addition of an aromatic amine.

B3) Use of Decamethylene Diisocyanate

Example B3.1

300 g of the resin masterbatch, prepared according to Example A3.1, are treated at 50 deg. C. with 40 g of BDDMA as well as with 2 g of tBBK; and then the gel time is set to 6 minutes at room temperature with the addition of an aromatic amine.

C) Preparation of the Reactive Resin Mortar

In order to prepare the hybrid mortars, the resin mixtures from B) are mixed with 30 to 45 parts by weight of silica sand, 15 to 25 parts by weight of cement and 1 to 5 parts by weight of pyrogenic silicic acid in the dissolver to form a homogeneous mortar composition.

D) Hardener Component

In order to prepare the hardener component, 40 g of dibenzoyl peroxide, 250 g of water, 25 g of pyrogenic silicic acid, 5 g of phyllosilicate and 700 g of quartz powder of appropriate particle size distribution in the dissolver are mixed to form a homogeneous mass.

The respective reactive resin mortars and the curing component are mixed in a volumetric ratio of 5:1; and their bond load capacity is measured.

Determination of the Failure Bond Stresses

In order to determine the failure bond stress of the cured composition, threaded anchor rods M12, which are doweled into holes in concrete with a diameter of 14 mm and a hole depth of 72 mm with the reactive resin mortar compositions of the examples, are used. In this case the holes were well cleaned, hammer drilled boreholes; the curing was always carried out at 20 deg. C. The mean failure loads are determined by extracting the threaded anchor rods in a concentric manner.

In each case five threaded anchor rods are dowelled in; and after 24 hours of hardening, their load values are determined. The bond load capacities σ (N/mm$^2$), determined in this way, are shown as the mean value in Table 1 below.

TABLE 1

| | Examples | | | | |
|---|---|---|---|---|---|
| | C1.1 | C1.2 | C2.1 | C2.2 | C3.1 |
| Bond Load Capacity σ [N/mm$^2$] | 14.0 ± 0.7 | 26.5 ± 1.0 | 13.8 ± 1.3 | 16.6 ± 1.7 | 11.9 ± 1.0 |

Commercially available products having very high bond load capacities, such as HIT HY200A from the company Hilti, achieve values of about 30 N/mm$^2$ under comparable conditions. As a result, it shows that the tested prototypes, in particular, the variant C1.2, based on TMDI, have a promising load profile.

The invention claimed is:

1. A resin mixture, comprising:
   a base resin comprising a vinyl ester urethane resin, wherein the vinyl ester urethane resin
   is obtained by
     (i) reacting at least two moles of a diisocyanate per mole of a dianhydrohexitol compound to obtain a product, and
     (ii) reacting the obtained product with a hydroxy-substituted (meth)acrylate to obtain the vinyl ester urethane resin.

2. The resin mixture of claim 1, wherein at least two moles of hydroxy-substituted (meth)acrylate per mole of the product from the reaction of (i) are used.

3. The resin mixture of claim 1, wherein the dianhydrohexitol compound is isosorbide.

4. The resin mixture of claim 1, wherein the diisocyanate is an aliphatic diisocyanate.

5. The resin mixture of claim 4, wherein the aliphatic diisocyanate is tetramethylene diisocyanate, hexamethylene diisocyanate or decamethylene diisocyanate.

6. The resin mixture of claim 1, wherein the hydroxy-substituted (meth)acrylate is a hydroxyalkyl(meth)acrylate.

7. The resin mixture of claim 6, wherein the hydroxyalkyl (meth)acrylate is hydroxypropyl(meth)acrylate or hydroxyethyl(meth)acrylate.

8. The resin mixture of claim 1, wherein the starting compounds for preparing the base resin is obtained from renewable resources.

9. The resin mixture of claim 1, wherein up to 80% of the carbon is derived from renewable resources.

10. A reactive resin mortar, comprising:
    the resin mixture of claim 1, and
    an inorganic aggregate, an organic aggregate or a mixture thereof.

11. The reactive resin mortar of claim 10, wherein the aggregates are selected from fillers and additives.

12. The reactive resin mortar of claim 10, wherein the content of the resin mixture is 10 to 60% by wt. of the reactive resin mortar.

13. A two component reactive resin mortar system, comprising:
    a reactive resin mortar of claim 10, and a hardener.

14. The two component reactive resin mortar system of claim 13, wherein the hardener contains a radical initiator as the curing agent and optionally an inorganic aggregate, an organic aggregate or a mixture thereof.

15. A reactive resin mortar, comprising:
    a resin mixture comprising:
      a base resin comprising a vinyl ester urethane resin, wherein the vinyl ester urethane resin
      is obtained by
        (i) reacting at least two moles of a diisocyanate per mole of a dianhydrohexitol compound to obtain a product, and
        (ii) reacting the obtained product with a hydroxy-substituted (meth)acrylate to obtain the vinyl ester urethane resin, and
    at least one inorganic aggregate selected from the group consisting of silica sand, cement and pyrogenic silicic acid,
    wherein a content of the resin mixture in the reactive resin mortar is 10 to 60% by wt. of the reactive resin mortar.

* * * * *